United States Patent
Vanderpool et al.

(10) Patent No.: US 10,338,603 B2
(45) Date of Patent: Jul. 2, 2019

(54) SYSTEMS AND METHODS FOR A MATERIAL HANDLING VEHICLE NETWORK

(71) Applicant: The Raymond Corporation, Greene, NY (US)

(72) Inventors: Joshua D. Vanderpool, Windsor, NY (US); Nathaniel W. Rogers, Binghamton, NY (US); Joseph L Callea, Norwich, NY (US); Ryan A. Magill, Binghamton, NY (US); Gregory W. Smiley, Greene, NY (US); Sandra L. Charles, Port Crane, NY (US); Timothy E. Donahue, Binghamton, NY (US)

(73) Assignee: The Raymond Corporation, Greene, NY (US)

(*) Notice: Subject to any disclaimer, the term of this patent is extended or adjusted under 35 U.S.C. 154(b) by 0 days.

(21) Appl. No.: 15/412,453

(22) Filed: Jan. 23, 2017

(65) Prior Publication Data
US 2017/0212526 A1    Jul. 27, 2017

Related U.S. Application Data

(60) Provisional application No. 62/286,136, filed on Jan. 22, 2016, provisional application No. 62/286,202, (Continued)

(51) Int. Cl.
| | |
|---|---|
| G05D 1/02 | (2006.01) |
| G07C 5/00 | (2006.01) |
| H04W 4/02 | (2018.01) |
| G06Q 10/08 | (2012.01) |
| H04L 29/08 | (2006.01) |
| H04W 4/04 | (2009.01) |

(52) U.S. Cl.
CPC ........... G05D 1/0291 (2013.01); G05D 1/028 (2013.01); G06Q 10/087 (2013.01); G07C 5/008 (2013.01); H04L 67/12 (2013.01); H04W 4/023 (2013.01); H04W 4/046 (2013.01); G05D 2201/0216 (2013.01)

(58) Field of Classification Search
USPC ........................................................ 701/117
See application file for complete search history.

(56) References Cited

U.S. PATENT DOCUMENTS

| | | |
|---|---|---|
| 5,499,182 A | 3/1996 | Ousborne |
| 7,417,559 B1 | 8/2008 | Janke |
| | (Continued) | |

FOREIGN PATENT DOCUMENTS

| | | |
|---|---|---|
| EP | 2053573 A1 | 4/2009 |
| WO | 2014042507 A1 | 3/2014 |

OTHER PUBLICATIONS

European Patent Office, Extended European Search Report, Application No. 17152460.6, dated Jul. 4, 2017.

*Primary Examiner* — Jean Paul Cass

(57) ABSTRACT

One or more material handling vehicles of a fleet can be equipped with telematics controllers and configured for wireless communication. In different arrangements, the material handling vehicles of the fleet can communicate with each other and with a management system, in order to effect management of the fleet and of particular material handling vehicles belonging thereto.

19 Claims, 5 Drawing Sheets

Related U.S. Application Data filed on Jan. 22, 2016, provisional application No. 62/286,195, filed on Jan. 22, 2016.

(56) References Cited

U.S. PATENT DOCUMENTS

| | | |
|---|---|---|
| 8,311,507 B2 | 11/2012 | Wheatley et al. |
| 8,825,226 B1 | 9/2014 | Worley, III et al. |
| 8,928,495 B2 | 1/2015 | Hassib et al. |
| 8,930,502 B2 | 1/2015 | Alvarez Rodriguez |
| 8,996,240 B2 | 3/2015 | Plante |
| 9,153,131 B2 | 10/2015 | Santucci et al. |
| 9,260,028 B2 | 2/2016 | Worley, III et al. |
| 9,349,181 B2 | 5/2016 | Chandrasekar et al. |
| 9,699,768 B2* | 7/2017 | Werb ............... H04W 4/70 |
| 2004/0264475 A1* | 12/2004 | Kowalski ............ H04L 47/24 370/395.5 |
| 2008/0157942 A1* | 7/2008 | Payne ............... B60R 25/08 340/426.12 |
| 2008/0177436 A1* | 7/2008 | Fortson ............ G05B 23/0221 701/31.4 |
| 2009/0005982 A1 | 1/2009 | Yu |
| 2009/0027229 A1* | 1/2009 | Fortson ............... H04Q 9/00 340/870.07 |
| 2009/0248237 A1 | 10/2009 | Koepf et al. |
| 2010/0179844 A1 | 7/2010 | Lafergola et al. |
| 2011/0148609 A1* | 6/2011 | Dabholkar ............ B60R 25/10 340/426.1 |
| 2012/0323474 A1* | 12/2012 | Breed ............... B60W 30/04 701/117 |
| 2014/0201064 A1 | 7/2014 | Jackson et al. |
| 2015/0226561 A1 | 8/2015 | Chandrasekar et al. |
| 2015/0351084 A1* | 12/2015 | Werb ............... H04W 4/70 370/329 |
| 2017/0011318 A1* | 1/2017 | Vigano ............ G06Q 10/06313 |
| 2017/0192637 A1* | 7/2017 | Ren ................. G01C 21/3667 |
| 2017/0325179 A1* | 11/2017 | Ameixieira ............ H04W 52/28 |
| 2017/0337813 A1* | 11/2017 | Taylor ............... G08G 1/0141 |

* cited by examiner

SYSTEMS AND METHODS FOR A MATERIAL HANDLING VEHICLE NETWORK

CROSS-REFERENCES TO RELATED APPLICATIONS

This application claims priority to U.S. Provisional Patent Application 62/286,136, titled "Systems and Methods for a Material Handling Vehicle Network" and filed Jan. 22, 2016, U.S. Provisional Patent Application 62/286,202, titled "Systems and Methods for a Material Handling Vehicle Mesh Network" and filed Jan. 22, 2016, and U.S. Provisional Patent Application 62/286,195, titled "Systems and Methods to Monitor Material Handling Vehicle Operation" and filed Jan. 22, 2016. The entire contents of each of these applications are incorporated herein by reference.

STATEMENT REGARDING FEDERALLY SPONSORED RESEARCH

Not Applicable.

BACKGROUND

The present invention relates generally to material handling vehicles and, more specifically, to operation and management of material handling vehicles via wireless communication, including in the context of one or more associated networks.

In some material handling vehicle operations, information about the material handling vehicle can be monitored (e.g., from remote installations). For example, one or more material handling vehicles can be monitored with regard to maintenance cycles, software configuration, operational or other options, vehicle diagnostics, vehicle performance or operations, vehicle status information, and so on. In some cases, the information obtained from such monitoring can be used to help manage the material handling vehicle(s). For example, information relating to maintenance cycles or vehicle diagnostics can be used to help schedule appropriate maintenance, and information relating to software configuration can be used to help schedule software updates, and so on.

In some instances, material handling vehicles may be provided with software or firmware updates on a regular (or other) basis. This may be useful, for example, in order to update the material handling vehicles to perform under the demands of the systems and contexts in which they operate. In conventional systems, updates to material handling vehicles can be implemented via direct human interaction (e.g., via an operator at the relevant vehicle manually facilitating or otherwise guiding an update process) or via a central server configured to push updates over a wireless network to each individual material handling vehicle.

In some instances, material handling vehicles can be operated in contexts in which readily locating one or more of the material handling vehicles can be difficult. For example, material handling vehicles can be operated in environments in which one or more of the vehicles are not always within line of sight of relevant monitors. Similarly, in some contexts, technical issues, missed communications, or other factors can result in difficulty in communicating with and/or locating certain material handling vehicles. In some cases, accordingly, the current location(s) of one or more material handling vehicles may not be readily identifiable by relevant personnel or management systems (i.e., the one or more material handling vehicles may be "missing" vehicles). The existence of missing material handling vehicles can reduce efficiency and effectiveness of a related fleet of material handling vehicles. Further, individual material handling vehicles that are missing or, for example, otherwise out of range of relevant communication systems, can miss updates or other maintenance, or miss or delay sending operational or other data to a relevant management system, for example.

SUMMARY OF THE INVENTION

In some embodiments, the present invention provides a system with a material handling vehicle that can include an embedded telematics controller configured to function as a web server. The telematics controller can interface with one or more mobile devices for a variety of functions. In some embodiments, multiple material handling vehicles can be provided, each including a respective embedded telematics controller configured to function as a web server.

In some embodiments, the present invention provides a management system for a fleet of material handling vehicles. The management system can include a management server system enabled for communication over a management network, and first and second material handling vehicles, each having a processor device and a communication device. The processor device of the first material handling vehicle can be configured to determine that the second material handling vehicle is in proximity to the first material handling vehicle and to obtain a vehicle identification from the second material handling vehicle. Based upon the vehicle identification, the second material handling vehicle can determine whether the second material handling vehicle is a missing vehicle.

In some embodiments, the present invention provides a fleet of material handling vehicles configured to be managed via a management network with a management server. The fleet of material handling vehicles can include first and second material handling vehicles, each having a telematics controller and a vehicle identification. A processor device of the first material handling vehicle can be configured to determine that the second material handling vehicle is in proximity to the first material handling vehicle and obtain the vehicle identification from the second material handling vehicle (e.g., via inter-vehicle communication coordinated by the two telematics controllers). Based upon the vehicle identification, it can be determined whether the second material handling vehicle is a missing vehicle, and a communications link can be established with the second material handling vehicle.

In some embodiments, the present invention provides a system with a material handling vehicle that can include an embedded computing device (e.g., a circuit card) and an embedded telematics controller (e.g., configured to function as a web server). The embedded computing device can be configured to monitor and record operational, maintenance, and other information regarding the material handling vehicle. The embedded telematics controller can be configured to transmit information recorded by the embedded computing device to another subsystem (e.g., a cloud-based analytics engine included in a cloud network). This recording and transmission of information, for example, can facilitate remote monitoring of a variety of operational and maintenance aspects of the material handling vehicle.

In some embodiments, a material handling vehicle can include a telematics controller and can be associated (e.g., can include on a component thereof) a barcode or other machine-vision identifier (e.g., an alphanumeric text identifier). One or more mobile devices configured to interface with the telematics controller can accordingly be configured for functionality including identification of the material handling vehicle. For example, a mobile device configured to communicate with the material handling vehicle via the telematics controller can include a mobile application that is configured for image capture or barcode scanning, and for optical character recognition ("OCR") or barcode decoding.

In some embodiments, a barcode or other machine-vision identifier associated with a material handling vehicle that includes an embedded telematics controller can encode or otherwise store connection information for one or more mobile devices to access the telematics controller. Accordingly, for example, the one or more mobile devices can decode or otherwise determine the connection information in order to establish a communications link with the material handling vehicle, as may be useful, for example, to access information (e.g., operational logs) stored on the material handling vehicle.

In some embodiments, functions of one or more mobile devices configured to interface with the telematics controller embedded in a material handling vehicle can include accessing information (e.g., operational data) from the material handling vehicle in order to provide real-time feedback to a supervisor, technician, or other monitor for the material handling vehicle.

In some embodiments, a material handling vehicle can include an embedded telematics controller and can be configured to store information relating to maintenance cycles and software configurations for the material handling vehicle. One or more mobile devices can be configured to communicate with the telematics controller, including for the purposes of providing software updates for the material handling vehicle, enabling (or otherwise selecting) operational or other options for the material handling vehicle, or associating select operators with the material handling vehicle (e.g., adding a new authorized operator for a particular material handling vehicle).

In some embodiments, an embedded telematics controller for a material handling vehicle can be configured to facilitate uploads and downloads of firmware and software configurations or updates for the material handling vehicle.

In some embodiments, the present invention provides a system with a material handling vehicle that can include an embedded telematics controller (e.g., configured to function as a web server). The system can further include a sub-system (e.g., a cloud-based analytic engine) that is configured to facilitate communication between multiple material handling vehicles in order to create a mesh network of material handling vehicles. In some embodiments, communication can also be facilitated between material handling vehicles and one or more mobile devices (e.g., via decoding of connection information via machine-vision analysis). In some embodiments, a mesh network of material handling vehicles can facilitate a variety of monitoring, maintenance, and other management functions, including transmission of information between material handling vehicles, one or more mobile devices, and/or a cloud network or other sub-system (e.g., a cloud-based analytic engine associated with a cloud network).

In some embodiments, a system can include multiple material handling vehicles, each including a respective embedded telematics controller capable of wireless communication. At least one of the material handling vehicles can include a cellular modem configured for Wi-Fi connectivity, and can be configured to serve as a cellular hot spot for other material handling vehicles (e.g., those without a cellular modem).

In some embodiments, a material handling vehicle can maintain a record (e.g., a continuous record) of other vehicles with which it comes into proximity within a particular (e.g., predetermined) time period. An embedded telematics controller of the material handling vehicle can be configured to report aspects of the record (e.g., which vehicles were encountered, as well as when and where) to a cloud-based data analytics engine (or other system). The cloud-based data analytics engine (or other system) can then determine whether any vehicles identified in the reported aspects of the record have been identified as missing.

In some embodiments, when a material handling vehicle with an embedded telematics controller comes into proximity with another vehicle that has been reported missing, the material handling vehicle can download data from the missing vehicle and transmit the data to a cloud-based data analytics engine (or other networked system).

In some embodiments, a material handling vehicle with a cellular modem configured for Wi-Fi connectivity can communicate with a cloud network in order to receive communications regarding software or firmware, such as software or firmware updates. After receiving the communications, the material handling vehicle can transmit similar communications (e.g., including relevant software or firmware updates) to other material handling vehicles with embedded telematics controllers. Accordingly, for example, a software or firmware update transmitted to a first vehicle can be propagated in a de-centralized or viral manner to multiple other vehicles.

The foregoing and other aspects and advantages of the invention will appear from the following description. In the description, reference is made to the accompanying drawings which form a part hereof, and in which there is shown by way of illustration certain embodiments of the invention. Such embodiments do not necessarily represent the full scope of the invention, and reference is made therefore to the claims and to the full description herein for interpreting the scope of the invention.

DESCRIPTION OF DRAWINGS

The invention will be better understood and features, aspects and advantages other than those set forth above will become apparent when consideration is given to the following detailed description thereof. Such detailed description makes reference to the following drawings.

DETAILED DESCRIPTION OF THE INVENTION

Figure 1:
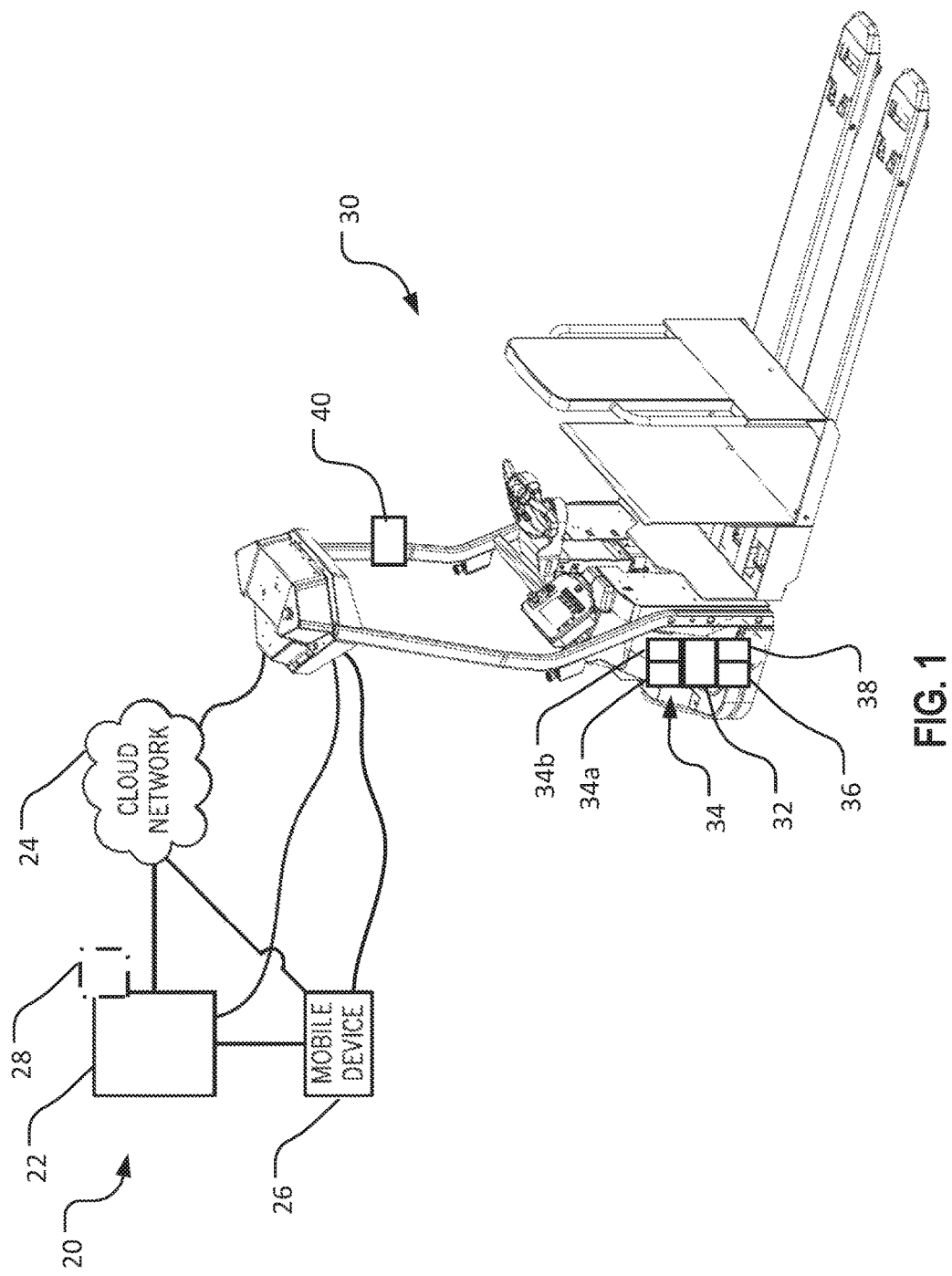
FIG. 1 illustrates isometric and schematic views of a system, according to some embodiments of the present invention, including a networked material handling vehicle and a mobile device.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Unless otherwise specified or limited, phrases similar to "at least one of A, B, and C," "one or more of A, B, and C," and the like, are meant to indicate A, or B, or C, or any combination of A, B, and/or C, including combinations with multiple or single instances of A, B, and/or C.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

It has been generally recognized that implementing networked systems for use with material handling vehicles can result in efficiency improvements and other benefits. For example, it can be useful to embed telematics controllers in particular material handling vehicles in order to equip the material handling vehicles for wireless communication. Thus equipped, for example, it may be possible for the material handling vehicles to communicate with remote management systems even without a wired communications link. In conventional arrangements, however, network-enabled material handling vehicles can suffer from communication lapses, significant capital or other costs, and other issues. For example, material handling vehicles often travel in environments that substantially interfere with long-range radio communication, and can also be employed in tasks that require travel a long distance away from fixed-installation systems (e.g., networked servers and other communications equipment). However, it can be relatively difficult and expensive (sometimes prohibitively so) to equip all material handling vehicles in a fleet with appropriately powered longer range communication equipment, and/or to install a wide-ranging non-mobile communications infrastructure (e.g., network relays, wireless access points, and so on).

Relatedly, in many contexts, it may be useful to fleet management to monitor material handling vehicles in various ways. For example, a monitoring system can usefully monitor current (or past) locations of material handling vehicles, operations undertaken by particular material handling vehicles (and/or particular operators), the states of various hardware, software, firmware, and other systems on material handling vehicles, and so on.

In conventional systems, monitoring equipment such as accelerometers and other sensors can be embedded in a material handling vehicle, so that various operations and states of the material handling vehicle can be checked and recorded. In order to obtain this information, however, technicians may need to establish a wired connection between the material handling vehicle and a computing device (e.g., via a serial port connection between the material handling vehicle and a laptop). Once the monitoring data is downloaded to the technician's computing device, the technician can analyze the data to determine whether maintenance or other operations are necessary for the material handling vehicle. However, in some cases, the need to establish a wired connection can reduce the efficacy of these systems. For example, where technicians can only connect to material handling vehicles intermittently, it can be difficult to identify issues for correction in real time.

Other conventional monitoring systems can use camera-based monitoring or specialized location monitoring systems with expensive, and often customized, fixed-location electronics.

Conventional monitoring systems can also exhibit sub-optimal efficacy with regard to missing vehicles (i.e., vehicles in locations that are uncertain or unknown to relevant management systems). For example, in place of human searching, which can be inefficient and slow, some conventional systems can equip each material handling vehicle with a relatively expensive Wi-Fi antenna, in order to rely on Wi-Fi tracking and triangulation to locate vehicles. Aside from the costs, however, these systems can be difficult to operate. For example, calibration of fixed-location tracking and triangulation systems can be difficult and may need to be repeated for each substantial change to the relevant environment (or workflow).

Other problems can also result from inefficient networking of material handling vehicles. For example, electronically transmittable updates can sometimes be provided for firmware (or other systems) on a material handling vehicle. In some cases, these updates can be disseminated from a central location, such as a management server. Where a material handling vehicle does not include appropriate telematics equipment, however, or when a material handling vehicle has strayed outside of a relevant communication range (e.g., gone missing), updates may not be pushed to the relevant targets with optimal efficiency. For example, where wired communication is required, updates may not be fully disseminated until each material handling vehicle of a fleet has returned to the relevant wired dissemination point. Further, even where material handling vehicles have been equipped with relatively expensive wireless communication equipment (e.g., cellular modems), material handling vehicles that have strayed beyond wireless range of a dissemination point (e.g., a central server or cloud network), may not receive updates when desired.

Embodiments of the invention can include material handling vehicles and related systems that can address various of the deficiencies noted above, as well as provide various other benefits.

Material handling vehicles can be designed in a variety of configurations to perform a variety of tasks. Although particular configurations of material handling vehicles may be illustrated or expressly discussed herein (e.g., automated guided vehicles for pallet lifting), embodiments of the invention are not limited to vehicles of these types. In some embodiments, for example, material handling vehicles can be configured as vans, semi-trucks, pickup trucks, pallet trucks, stacker trucks, fore-aft stance operator lift trucks, reach trucks, high-lift trucks, counterbalanced trucks, swing-reach trucks, and so on. As further examples, embodiments of the invention may be suitable for rider-controlled, pedestrian-controlled, remotely-controlled, and other material handling vehicles, as well as partially motorized or non-motorized carts or load platforms (e.g., carts configured to be manually pushed by an order picker or other personnel).

FIG. 1 illustrates an example system for managing a fleet of material handling vehicles. Generally, the system includes a management system 20 (e.g., a set of customized servers and other communication equipment), which can be configured for wired or wireless communication with various other systems. In the embodiment illustrated, the management system 20 includes a management server 22 with communication links to a cloud network 24 (e.g., a Wi-Fi, cellular, or other network). Communication (e.g., wireless communication) is also enabled between the management server 22 and various personal electronic devices, such as a mobile device 26. In some embodiments, the management server 22 can host, or can be in operational communication with, a cloud-based analytics engine 28.

FIG. 1 further illustrates an example material handling vehicle ("MHV") 30. The MHV 30 is generally configured for communication with the management system 20 and, as such, can include various communication equipment. In the embodiment illustrated, the MHV 30 includes a telematics controller 32 configured to manage communication via one or more wireless radios 34. In some embodiments, multiple radios 34 can be provided, with each radio 34 dedicated to a particular communications channel or link. For example, a first radio 34a can be configured as a cellular modem (or other longer range communication device) and can be dedicated for communication with the management server 22 and/or with the cloud network 24. Likewise, a second radio 34b can be configured for Bluetooth® or other close-range communication with other devices, including other material handling vehicles (not shown in FIG. 1). (Bluetooth is a registered trademark of Bluetooth SIG, Inc. in the United States and/or other jurisdictions.)

In some embodiments, the telematics controller 32 can be configured to function as a web server. For example, as also discussed below, the telematics controller 32 can be configured to serve home (or other) web pages for the MHV 30 that can provide management access to the MHV 30 for a technician or other personnel.

In addition to the equipment discussed above, the MHV 30 can include other electronic equipment. In the embodiment illustrated, for example, the MHV 30 is equipped with a motion sensor 36. Generally the motion sensor 36 can be configured to sense motion of the MHV 30 and/or one or more components thereof (e.g., the forks or wheels of the MHV 30). In some embodiments, the motion sensor 36 can be configured as a circuit card with one or more of a 3-axis accelerometer, a 3-axis gyroscope, and a 3-axis magnetometer. In this way, for example, the motion sensor 36 can collect motion data relative to nine degrees of freedom, and can support dead reckoning measurements as well as tracking of relative locations and movements.

Generally, various sensors or other equipment on the material handling vehicle can be connected to a processor device 38 (e.g., a general- or special-purpose computer) on the MHV 30. Sensors connected to the processor device 38 can provide data, which can be logged, concatenated and/or analyzed (e.g., by the main processor device 38) and, as appropriate, sent to the telematics controller 32 (e.g., at defined intervals) via communication methods such as a controller area network (CAN) and or a Serial (e.g., RS-232) connection. Data from sensors connected directly to the telematics controller 32 can also be processed (e.g., by the telematics controller 32 or by the processor device 38) and, as appropriate, logged, combined with other data, and/or analyzed.

In the embodiment illustrated, the MHV 30 also includes a machine-vision readable identifier 40, which can encode identification data for the MHV 30. The identifier 40 can, for example, be configured as a visual identifier, such as a one- or two-dimensional barcode or similar symbol, or as an OCR-compatible alphanumeric code. In some embodiments, an identifier can additionally (or alternatively) store identification information electronically (or otherwise). For example, some embodiments of an identifier can include a Bluetooth beacon, a RFID tag, or another electronic device configured to provide identification for the MHV 30 to other electronic devices.

Generally, the identifier 40 (and the identification data encoded therein) can be used to enable other electronic devices to identify and/or communicate with the MHV 30. For example, the identifier 40 can encode an IP address or other identifier (e.g., serial number or other network-related address) for the MHV 30. Accordingly, a device that decodes the identifier 40 can determine an appropriate manner of connecting to the MHV 30 for further communication (e.g., can direct a browser to the decoded IP or other address, or can query a local or remote look-up table to determine communication information based on a decoded serial number or other identification).

In some embodiments, as also discussed below, the identification data of the MHV 30 can also (or alternatively) be stored separately from the identifier 40. For example, the telematics controller 32 can be configured to use one of the radios 34 to broadcast (or selectively communicate) the identification data for the MHV 30. Similarly, in some embodiments, the telematics controller 32 can be configured to serve a web page at a predetermined address, which can also provide certain identification for the MHV 30 as well as, for example, diagnostics, status information, vehicle options and so on.

As also noted above, the example system illustrated in FIG. 1 also includes the mobile device 26. In some embodiments, the mobile device 26 can be a commercial mobile device. In some embodiments, the mobile device 26 can be a smart device such as a cell phone or a tablet.

Generally, the mobile device 26 is configured to connect wirelessly to management system 20. For example, the mobile device 26 can be configured to connect to the management server 22 and/or the cloud network 24 using a Wi-Fi connection, a cellular-band connection, a Bluetooth connection, and so on.

In some embodiments, the mobile device 26 can include the capability to obtain machine vision identification information. For example, the mobile device 26 can include a general-purpose camera or a dedicated bar code reader and can host (or otherwise access) applications for decoding captured images (e.g., for decoding barcodes or executing optical character recognition ("OCR") on images of text).

As noted above, the cloud network 24 can be established using Wi-Fi, cellular, or other communication technologies. In some embodiments, the cloud network 24 can be an internal network that is limited to one or more specific locations. In some embodiments, the cloud network 24 can be located (or extend) remotely (e.g., on a separate local area network from the server 22). In some embodiments, the cloud network 24 can provide connection means to the Internet and/or to remote data storage.

Also as noted above, the cloud network 24 can host (or otherwise be in communication with) the cloud-based analytics engine 28. The cloud-based analytics engine 28 can, for example, be configured to store and/or analyze data acquired from or regarding other devices (e.g., MHVs) or networks (e.g., mesh networks, as also discussed below). In some embodiments this data can include, for example, diagnostics data, location data, data concerning maintenance cycles or system updates (e.g., for software or firmware), and so on.

Figure 2:
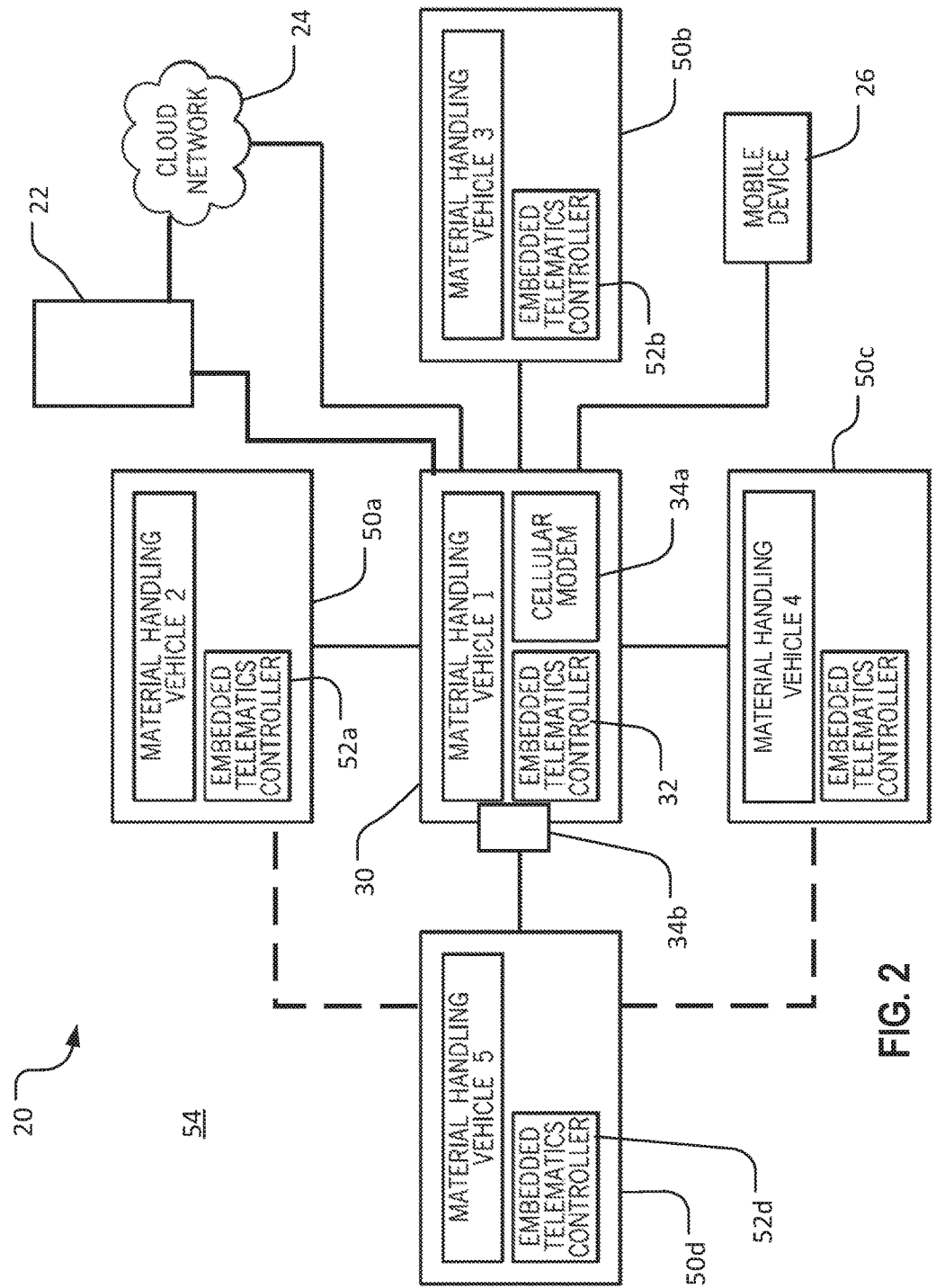
FIG. 2 shows a representative view of a mesh network, according to some embodiments of the present invention, including the networked material handling vehicle and the mobile device of FIG. 1.

In some embodiments, the fleet of material handling vehicles that is managed via the management system 20 can include multiple material handling vehicles configured for direct or indirect communication with the management server 22 and, in some cases, the cloud network 24. As illustrated in FIG. 2, for example, a group of five MHVs, including the MHV 30 as well as MHVs 50a through 50d can be configured for operation under the management system 20.

In the embodiment illustrated, each of the MHVs 50a through 50d includes a respective embedded telematics controller 52a through 52d. The telematics controllers 52a through 52d (and related communication systems) can be configured similarly to each other and to the telematics controller 32 (and related communication systems) or can be configured differently from each other or from the telematics controller 32. In the embodiment illustrated in FIG. 3, for example, the telematics controllers 52a through 52d are configured to communicate over shorter range communication links (e.g., Bluetooth connections) but are not configured for cellular communication. In other embodiments, other configurations are possible.

As illustrated in FIG. 2, the MHVs 30 and 50a through 50d are configured to be able to form a mesh network 54. Generally, the MHVs 30 and 50a through 50d can form respective nodes of the mesh network 54, with communications links being formed and maintained (as possible and appropriate) between the MHVs 30 and 50a through 50d, as well as between one or more of the MHVs 30 and 50a through 50d and the mobile device 26, the cloud network 24, or the management server 22, and so on.

In the embodiment illustrated, the MHVs 50a through 50d are not equipped with cellular modems and therefore may not be able to establish direct long-range wireless communication with other equipment, such as the management server 22, devices of the cloud network 24, and so on. In some embodiments, the MHV 30 can accordingly be configured to act as a link for communication between the MHVs 50a through 50d and other devices. For example, the MHV 30 can establish a communications link with the MHV 50d using the radio 34b and can establish a communications link with the server 22 via the cellular modem 34a (or another device, such as the mobile device 26). In this way, for example, the MHV 50d can communicate with the server 22 (or various other devices) via the MHV 30, with the MHV 30 effectively acting as a cellular hotspot for the MHV 50d. As another example, the MHV 50d can establish a communications link with the server 22 (or another device) via multiple MHVs (or other devices). For example, the MHV 50d can establish a communications link with the MHV 50a, the MHV 50a can establish a communications link with the MHV 30, and the MHV 30 can establish a communications link with the server 22.

In some embodiments, communication over the mesh network 54 (and between MHVs and other devices generally) can be implemented in real-time. In some embodiments, communication can be non-synchronous. For example, the MHV 30 can establish a communications link with the server 22 in order to exchange information with (e.g., download updates from) the server 22. The MHV 30 can then later establish a communications link with the MHV 50d in order to exchange at least some of the same information with (e.g., upload the updates to) the MHV 50d, even if a communications link between the MHV 30 and the server 22 is no longer open or active.

As generally discussed above, the MHV 30 can be configured to provide identification data for the MHV 30 to the mobile device 26 and to generally establish a communications link with the mobile device 26 (e.g., using the telematics controller 32 and the radio 32a or 34b). In some embodiments, this can usefully allow for mobile management of the MHV 30, as well as other similarly equipped MHVs in a fleet.

In some implementations, for example, a mobile device can interrogate an MHV in order to determine identification data of the MHV. Based upon the determined identification, the mobile device can then establish a communication link with the MHV in order to manage various sub-systems thereof. For example, a mobile device can be used to scan a machine-vision readable item (e.g., a barcode) on an MHV or interrogate an electronics device (e.g., an RFID tag), in order to determine identification that includes connection information for the MHV (e.g., an IP or other electronic address). Using the connection information, the mobile device can then establish a communication link directly with the MHV for maintenance or other operations.

Figure 3:
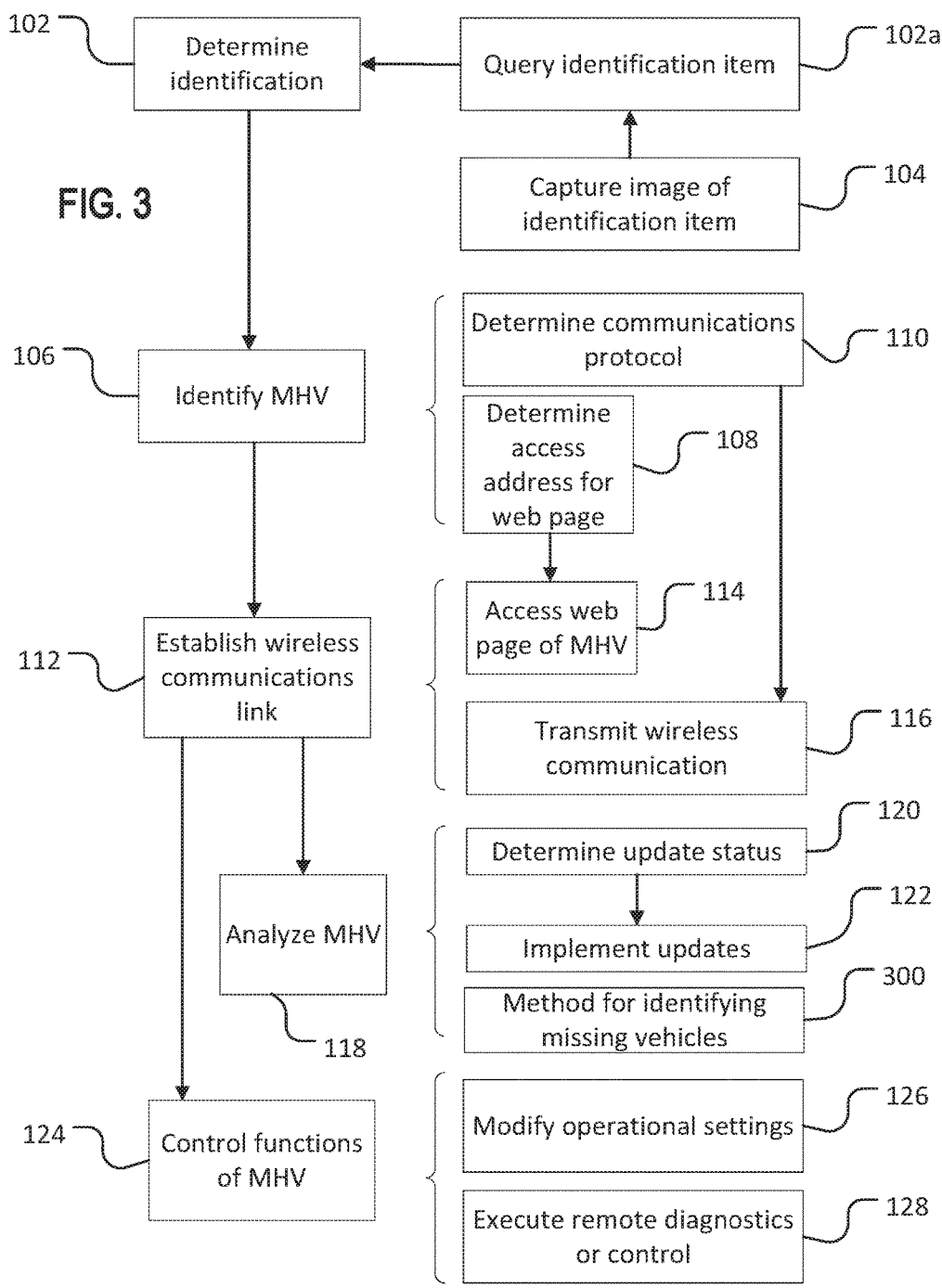
FIG. 3 illustrates a method for mobile management of the material handling vehicle of FIG. 1, according to some embodiments of the present invention.

FIG. 3 illustrates an example method 100 for mobile management of the MHV 30. In some implementations, an operator or other personnel within appropriate proximity to the MHV 30 can use the mobile device 26 to determine 102 identification data of the MHV 30 (e.g., via querying 102a an identification item such as a barcode or RFID tag). In some embodiments, the mobile device 26 can visually query 102a the identification data by capturing 104 an image of the identifier 40 and decoding identification information represented by the identifier 40. In some embodiments, the mobile device 26 can query 102a the identification data in other ways, including through wireless (e.g., Bluetooth- or RFID-based) communication.

Based upon the determining 102 of the identification data, the mobile device 26 can identify 106 the MHV 30 to enable communication with the MHV 30. In some implementations, identifying 106 the MHV 30 can include determining 108 an access address for a web page that is served by the telematics controller 32. In some implementations, identifying 106 the MHV 30 can include determining 110 a communications protocol for communications with the telematics controller 32.

Based upon identifying 106 the MHV 30, a wireless communications link can then be established 112 so that the MHV 30 and the mobile device 26 can directly communicate with each other. For example, the mobile device 26 can wirelessly access 114, and display for user interaction, a web page served by the telematics controller 32 of the MHV 30 (or another relevant web page), or can otherwise format and transmit 116 a wireless communication using the determined 110 communications protocol.

Once the communications link has been established 112, the mobile device 26 can be operated in order to analyze 118 current status, past operations, or other aspects of the MHV 30 or various subsystems thereof. For example, via the access 114 to the web page of the MHV 30, the mobile device 26 can be used to download and/or manage maintenance configurations and operations, software or firmware configurations, operational options, operator-based settings (e.g., operator-specific operational constraints), and other aspects of the MHV 30. In some implementations, the mobile device 26 can be used to determine 120 an update status of firmware or other updatable aspect (e.g., operating system) of the MHV 30 and to implement 122 updates as appropriate, based upon the determined 120 update status. For example, the mobile device 26 can be used to determine 120 whether an update is available for firmware of the MHV 30, and then transmit an update from the management server 22 (e.g., as previously or synchronously downloaded to the mobile device 26) to the MHV 30, as appropriate.

In other implementations, the mobile device 26 can be used to similarly connect to other MHVs. In some cases, this can be particularly useful for MHVs that are not equipped for wireless communication with the management system 20 or that are otherwise not in direct communication with the management system 20 (e.g., due to being out of communication range for the relevant telematics controller and communication devices). In such cases, the mobile device 26 may be in communication with the management system 20 (e.g., via a cellular link) even though the relevant MHV may not be. Accordingly, for example, the mobile device 26 can serve as a bridge between the of the MHV and the management system 20, so that relevant information can flow between the MHV and the management system 20, even though a direct communication link between the two may not be available.

In some embodiments, the identifying 106 of an MHV and/or establishing 112 a wireless communications link can allow the mobile device 26 to enable or disable features of the MHV, or to otherwise control 124 various functions of the MHV. For example, once the mobile device 26 has established 112 a wireless communications link with the MHV and accessed a relevant interface with the MHV (e.g., a webpage served by the relevant embedded telematics controller), the mobile device 26 can be used to modify 126 operational settings for the MHV, such as maximum speed or acceleration settings. Similarly, the mobile device 26 can be used to execute remote diagnostic or other control functions 128, including stopping operation of the MHV or various components thereof (e.g., a lifting device of the MHV), implementing a "lock-out" mode to prevent an operator (or operators or other personnel) from using the MHV or various components or capabilities thereof, remotely cycling vehicle subsystems, including by blowing a horn, flashing one or more vehicle lights, firing one or more relays, turning one or more digital outputs (or other ports) on or off, and so on.

In some embodiments, the mobile device 26 can analyze 118 the MHV 30 with regard to whether the MHV 30 is currently designated as a missing vehicle. For example, the mobile device 26 can implement part or all of a method 300 for identifying missing vehicles, as further detailed below.

Figure 4:
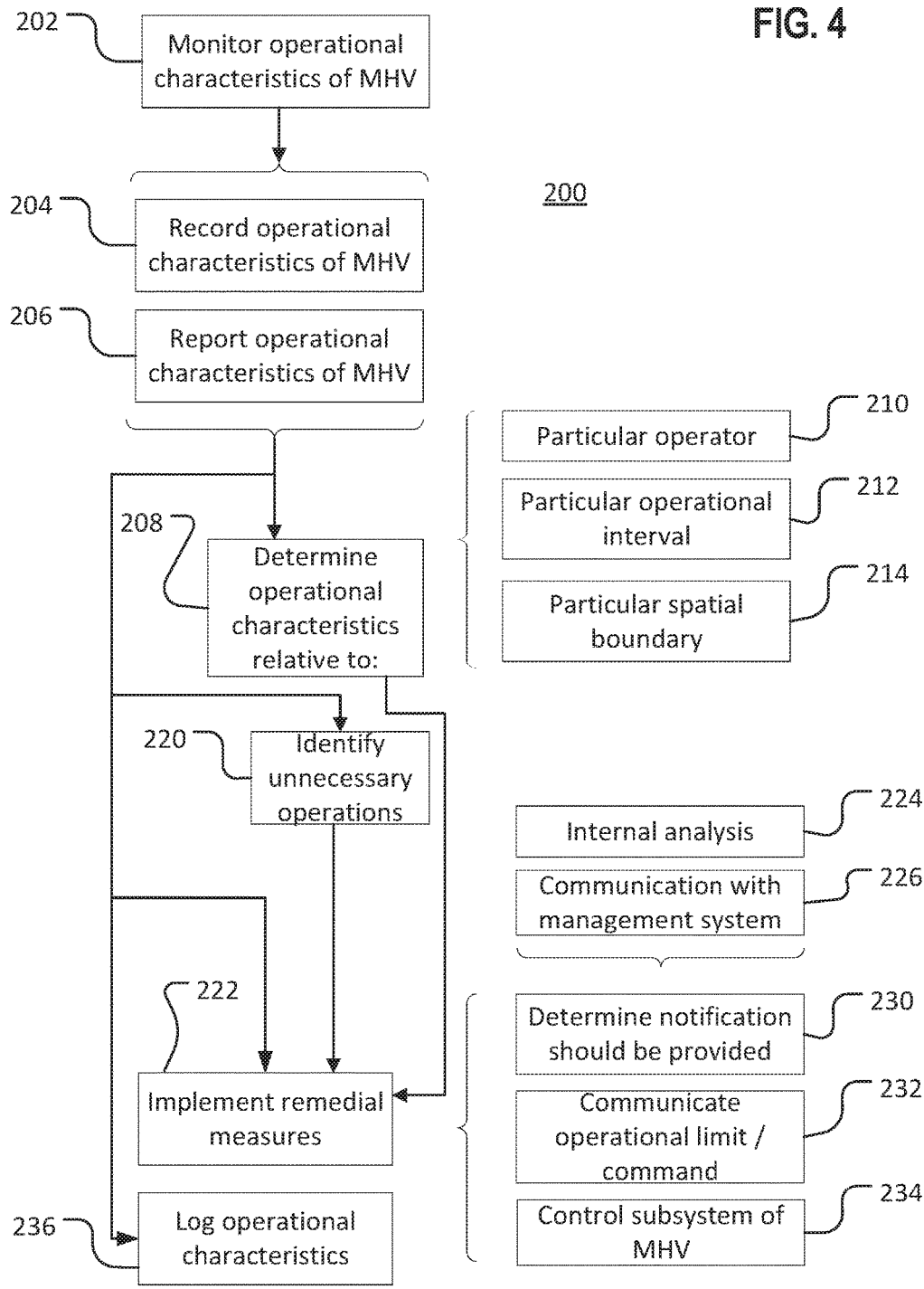
FIG. 4 illustrates a method for monitoring one or more material handling vehicles, according to some embodiments of the present invention.

In some embodiments, one or more MHVs of a fleet can be configured to monitor their own operation and to report data relating to such monitoring to the management system 20. An example of such monitoring is illustrated as monitoring method 200 in FIG. 4. Under the method 200, for example, a processor device of an MHV can monitor 202 operational characteristics for the MHV. As appropriate, the monitored 202 operational characteristics can then be recorded 204 (e.g., locally on the MHV) and reported 206 to the management system 20 (e.g., via a direct wireless communications link, the mesh network 54 (see FIG. 2), the mobile device 26, and so on). In some implementations, for example, the processor device 38 of the MHV 30 (e.g., via the telematics controller 32) can be configured to locally monitor 202 and record 204 driving or other operational characteristics (e.g., historical operations or operational settings).

In some implementations, monitored 202 operational characteristics can be reported 206 to a remote system. For example, operational characteristics of an MHV can be monitored 202 and recorded 204 locally, then reported 206 (at least in part) to the management system 20 via the telematics controller 32 and the radio 34*a*.

Consistent with the discussion above, communication for the reporting 206 of operational characteristics (and other data) from an MHV to the management system 20 can be implemented in various ways, including through direct wireless communication links, through the mesh network 54 (see, e.g., FIG. 2), through a bridge device (e.g., the mobile device 26 or a cellular-enabled MHV, such as the MHV 30), and so on.

In some implementations, monitored 202 (and recorded 204) operational characteristics can include historical operational settings (e.g., speed, load, or movement limitations). In some implementations, monitored 202 (e.g., recorded 204 historical) operational characteristics can relate to (and can therefore be determined 208 relative to) a particular operator 210 of the relevant MHV, to a particular operational interval 212 (e.g., predetermined shift time) of the relevant MHV, to operations 214 within a particular geographical or other boundary (e.g., within a particular portion of a warehouse), or to various other data boundaries.

Generally, the relevant MHV can be configured to collect and to concatenate the various operational characteristics and to report 206 them, directly or indirectly, to a relevant system (e.g., a remote management system, such as the system 20) for further diagnostic or management actions. In some embodiments, such data can be collected, for example, via the motion sensor 36 (see FIG. 1) or various other devices. In some implementations, the relevant MHV can be configured to communicate these data to the cloud-based data analytics engine 28 for detailed analysis and, as appropriate, generation and delivery of actionable reports to the relevant MHV and/or to relevant personnel.

In some implementations, recording 204 and reporting 206 of monitored 202 operational characteristics can allow for the limiting of vehicle performance. For example, upon receiving historical operational characteristics for the MHV 30, the cloud-based data analytics engine 28 (or another system, such as the mobile device 26 or the management server 22) can analyze movement or other operational data for the MHV in order to evaluate whether the MHV 30 has been operated within desired operational parameters (e.g., within acceptable limits for speed, load weight, turning angle as a function of speed, and so on). In this regard, for example, the cloud-based data analytics engine 28 (see FIG. 1) or other management system can be configured to identify 220 unnecessary operations for an MHV. As appropriate, based on such identifying 220, a relevant management system (e.g., the management system 20, via the management server 22 or the mobile device 26) can then implement 222 appropriate remedial measures, such as scheduling or implementing preventative maintenance, selectively activating or deactivating vehicle systems (e.g., lights, horns, motive devices, user interfaces, and so on), or requiring an update (e.g., for firmware).

In some implementations, an MHV can be configured to communicate issues regarding operational characteristics directly to a relevant operator. For example, based upon internal analysis 224 or communication 226 with the management system 20, the MEW 30 can determine 228 that a notification (e.g., a high-speed, over-load, or other notification) should be provided to the operator of the MHV 30 and can provide 230 the notification accordingly (e.g., via a user interface of the MHV 30). In some implementations, the MHV 30 can similarly undertake other remedial actions in accordance with aspects of the operational characteristics analyzed by the MHV 30 and/or the management system 20, including activating, disabling, or otherwise controlling 234 various subsystems of the MHV 30, providing a firmware or other update to the MHV 30 (see, e.g., aspects of the method 100, as illustrated in FIG. 3), and so on. Like providing 230 a notification, determining a need for and then undertaking control 234 or implementing 222 other remedial measures can be executed based upon internal analysis 224 and/or communication 226 with the management system 20 or other remote personnel.

In some implementations, remedial or other actions can be undertaken in real time for a particular MHV. In some cases, based upon the cloud-based analytics engine 28 identifying 220 that the MHV 30 is not operating (or has not operated) appropriately, the management server 22 can communicate 232 an appropriate operational limit or other command to the MHV 30. For example, the management server 22 can communicate 232 with the MHV 30 (e.g., directly or over the mesh network 54) in order to implement a speed limit or other restriction for the MHV 30.

In some cases, the management system 20 (or the various MHVs) can log 236 activity from the monitoring 202 of operational characteristics, in order to amass relevant historical records. For example, the management system 20 can be configured to log 236 operational characteristics for a particular MHV, for a particular operational interval (e.g., a particular shift), for a particular operator or team or operators, for a particular geographical space (e.g., a particular portion of a warehouse), and so on. This can be useful, for example, in order to enable detailed analysis of operational characteristics of a particular MHV or a fleet of MHVs. For example, based upon detailed logs of operational characteristics of a fleet of MHVs, the cloud-based analytics engine 28 (see FIG. 1) can execute complex data analysis in order to identify areas for improvement.

As also noted above, it can be useful to implement chained (e.g., mesh-network) communication between different MHVs. For example, a group of MHVs linked in a mesh network can efficiently communicate with the management system 20, even if certain MHVs are not equipped with communications equipment for direct communication with the management system 20. Similarly, in some implementations, one MHV of a networked group of MHVs can act as a hotspot for other MHVs in the group. For example, an MHV with a longer range cellular modem and a shorter range radio antenna can serve as a bridge to a remote system (e.g., the management system 20) for other MHVs that are equipped only with a shorter range antenna (or other similar communication equipment).

In some implementations, accordingly an MHV with a network connection to the management system (e.g., a cellular link to the management server 22) can serve as a hub for collecting or disseminating information to or from other MHVs. In this way, for example, an MHV with a cellular connection to the management server 22 can download updates or other data from the management server 22 for dissemination to other MHVs. This may be useful, for example, in order to assist in appropriate distribution of updates (e.g., firmware updates) to MHVs that do not have longer range communication equipment (e.g., cellular modems), that may not be (or may not be scheduled to soon travel) within direct communication range with the management system 20, or that are "missing" vehicles. Similarly, for example, an MHV with a cellular connection to the management system 20 (or other remote systems) can collect data from other MHVs for transmission to the management system 20 (or other system) for analysis. In this way, for example, data from MHVs that do not have longer range communication equipment (e.g., cellular modems), that may not be (or may not be scheduled to soon travel) within direct communication range with the management system 20, or that are "missing" vehicles can still be readily transmitted for logging and analysis (e.g., at the cloud-based analytics engine 28).

In some embodiments, including with various MHVs forming part of the mesh network 54 (see FIG. 2), collection or dissemination of information from or to MHVs can be effected in a viral manner. For example, a first MHV may download a firmware update from the management server 22 when the first MHV is within range for direct (e.g., cellular) communication with the management server 22 (or a network to which the management server 22 is connected). The first MHV can then transmit the firmware update to other MHVs that are later encountered by the first MHV, so that the update is disseminated by the first MHV as well as by (or as an alternative to) the management server 22. Additionally, the MHVs that receive the firmware update from the first MHV can, as appropriate, transmit the firmware update to still other MHVs. In this way, for example, firmware updates (or other data) can be rapidly and efficiently spread throughout an MHV fleet, even if some vehicles of the fleet are not equipped with full-function communication equipment or are otherwise unable to connect directly to the management system 20 (e.g., because of being currently disposed out of communication range or being a "missing" vehicle).

In this regard for example, referring again to FIG. 3, a particular MHV (e.g., a cellular-enabled MHV) can execute operations such as identifying 106 another encountered MHV, establishing 112 a wireless communication link with the encountered MHV, and analyzing 118 the encountered MHV to determine 120 an update status of the encountered MHV. As appropriate, the particular MHV can then implement 122 updates for the encountered MHV and, in some cases, further instruct the encountered (and now-updated) MHV to disseminate the update to other MHVs.

In some implementations, various arrangements and configurations of networked MHVs and a networked management system, including some arrangements discussed above, can be useful in locating missing vehicles. Generally, for example, a first MHV can be configured to query another MHV in order to obtain (or otherwise determine) identification data for the other MHV. Based upon a comparison of the obtained identification with a register of missing vehicles (or other relevant data source), it can then be determined whether the other MHV, as encountered by the first MHV, is a missing MHV. If so, appropriate remedial action can be taken, including through communication of relevant details to a management system, or through controlling, via the first MHV, aspects of the missing (and now-encountered) MHV.

In some implementations, an MHV (e.g., the MHV 30) can be configured to query (e.g., automatically) other MHVs with which it comes into proximity (e.g., in order to determine identification information for the other MHVs). In this regard, "proximity" can include various measures of closeness, including physical distance, availability of communication links between two MHVs (e.g., via particular communication channels or devices), coincident presence of both vehicles in a predetermined area (e.g., a warehouse section), and so on.

Generally, an MHV can query identification data of another MHV in various ways. In some implementations, for example, the MHV 30 can communicate with another MHV using the telematics controller 32, with the other MHV sending identifying data (e.g., serial number or IP address) to the MHV 30 wirelessly. In some implementations, machine vision systems can be used. For example, a machine vision system on the MHV 30 (not shown) or on an associated mobile device (e.g., the mobile device 26) can be used to scan and decode an identifier (e.g., barcode or text symbol) on another MHV.

Once identification data for an encountered MHV has been determined (e.g., received via electronic transmission), the MHV 30 can then determine, in various ways, whether the encountered MHV is a missing vehicle. Generally, for example, the MHV 30 can cause identification data for an encountered MHV to be compared with a record of missing vehicles in order to determine whether the encountered vehicle is missing.

In some implementations, the MHV 30 can log identification data for encountered MHVs (e.g., individually or collectively) and transmit the identification data (e.g., at a predetermined time, location, or interval) to the management system 20. The management system 20 can then compare the identification data to a record of "missing" vehicles, in order to determine whether the MHV(s) encountered by the MHV 30 may be missing. As appropriate, the management system 20 can then communicate to the MHV 30 that one or more of the MHVs encountered by the MHV 30 are missing vehicles.

In some implementations, the MHV 30 can be configured to download from the management system 20 a record of which other MHVs in the fleet are currently missing. For example, the MHV 30 can download such a record whenever it comes into direct communication range with the management system 20, at a predetermined interval, upon encountering another MHV, or at various other times. Upon identifying an encountered MHV (or at various times thereafter), the processor device 38 can then compare the identification data of the encountered MHV to the record of missing vehicles (e.g., as locally stored on the MHV 30), in order to determine whether the encountered MHV is indeed missing.

In some embodiments, other data can be downloaded from an encountered MHV (or otherwise determined) for analysis or transmission. For example, upon encountering (e.g., and after identifying) an MHV, the MHV 30 can note the time and location of the encounter, which may be useful to addressing the encountered MHVs missing status. Further, the MHV 30 can be configured to download other data from the encountered MHV, such as a log of recent locations of the encountered MHV, a record of other vehicles encountered by the encountered MHV (as well as when and where), a status of various subsystems of the encountered MHV (e.g., one or more device statuses, or an update status for relevant firmware or software), or other data. Part or all of this data can then be analyzed locally by the MHV 30, or can be transmitted, as appropriate to the management system 20 for analysis or storage. For example, upon (or before) determining that an encountered MHV is a missing vehicle, the MHV 30 can use the telematics controller 32 to transmit to the management system 20 a current location of the encountered MHV, status information for the encountered MHV, and so on. This information can then be used by the managements system 20, as appropriate, in order to determine appropriate remedial actions.

Upon determining that an encountered MHV is a missing vehicle, various remedial measures can be undertaken, including through the agency of the MHV 30. In some implementations, for example, the MHV 30 can be configured to communicate with an encountered (and missing) MHV in order to determine whether updates are available for the encountered MHV. If so, and as needed, the MHV 30 can then act as a hub for disseminating an update from the management system 20 to the encountered MHV.

In some implementations, remedial measures can include the MHV 30 (i.e., the MHV that encounters a missing MHV) taking control of various aspects of the encountered MHV. For example, the MHV 30, via the telematics controller 32, can control an encountered MHV in order to lock a select operator (or operators or other personnel) out of operating the encountered MHV (e.g., so that only particular operators can operate the encountered MHV), to activate, deactivate, or cycle a sub-system of the encountered MHV (e.g., lights, digital ports, horns, and so on), or even to initiate a follow-mode for the encountered MHV, so that MHV 30 can lead the encountered MHV to an appropriate checkpoint or deployment station.

In some implementations, remedial measures can include execution of diagnostic functions on the encountered MHV by the MHV 30, or transmission of data from the encountered MHV to the management system 20 via the MHV 30. For example, the MHV 30 can download an operations or locations log of an encountered (and missing) MHV and can transmit the log to the management system 20, so that the cloud-based analytics engine 28 can analyze the data for useful patterns.

Figure 5:
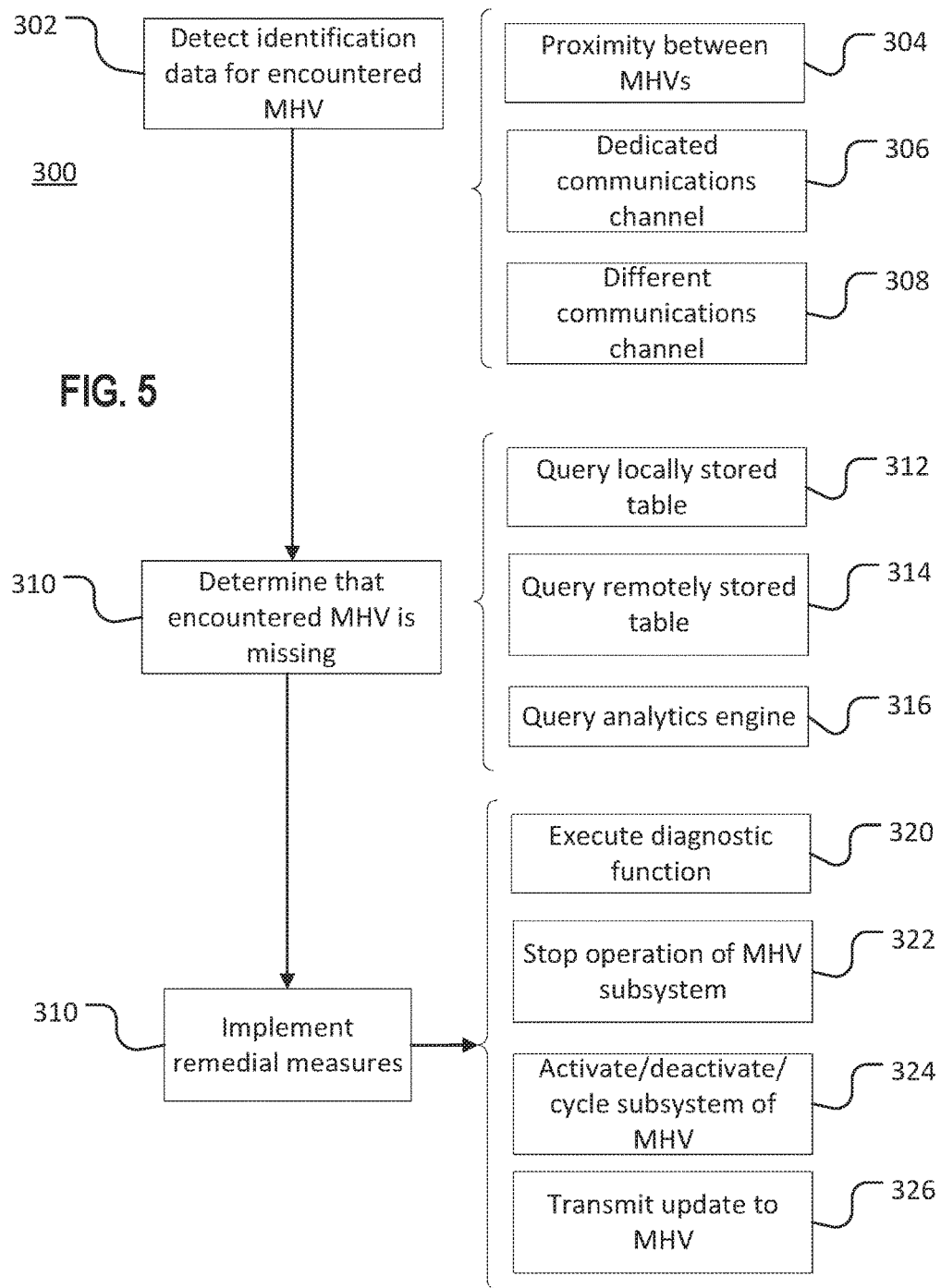
FIG. 5 illustrates a method for managing one or more missing material handling vehicles, according to some embodiments of the present invention.

In some implementations, missing MHVs can be identified and otherwise managed using a method 300, as illustrated in FIG. 5. For example, an MHV (e.g., the MHV 30) can encounter another MHV and can detect 302 (or otherwise determine) identification data for the encountered MHV. In some implementations, detection 302 of identification data of an encountered MHV can be implemented based upon proximity 304 between the detected and detecting MHVs (e.g., based on communications proximity, physical proximity, and so on). In some implementations, detection 302 of identification data of an encountered MHV (and communication with an encountered MHV generally) can be implemented over a dedicated communication channel 306 (e.g., dedicated shorter range radio device) and/or over a different communication channel 308 than is used for communication between the detecting MHV and an overarching management system (e.g., the management system 20).

Based upon the detected 302 identification of the encountered MHV, the encountered MHV can then be determined 310 to be a missing vehicle. For example, in order to determine whether an encountered MHV is missing, the MHV that detects 302 the identification data can query 312 a locally stored table of missing vehicles, can query 314 a remotely stored table of missing vehicles, or can query 316 an analytics engine, which can analyze data patterns (e.g., as dawn from an operational or other log for the encountered MHV) in order to determine 310 whether the encountered MHV is a missing vehicle.

Once an encountered MHV is determined 310 to be a missing vehicle, various remedial measures can be implemented 318. For example, the MHV that encounters the missing vehicle can (e.g., over the dedicated communications channel 306) execute 320 a diagnostic function for the encountered material handling vehicle, stop 322 operation of one or more subsystems of the encountered MHV (e.g., with resumption of operations contingent on commands from a select operator), activate, deactivate, or cycle 324 one or more subsystem of the encountered MHV, or transmit 326 an update (e.g., a firmware update) for the encountered MHV.

Thus, embodiments of the invention can provide for more effectively managed fleets of MHVs, including through dissemination of updates, tracking of operations of various MHVs within the fleets, identification and remediation of missing vehicles, and so on. In some embodiments, the invention can provide for a longer service life for the relevant MHVs as well as promote desired operation of the MHVs in a relevant facility. Additionally, costs of ownership for MHV fleets can be reduced (e.g., by allowing for effective communication with and within the fleet without necessarily requiring each MHV to include expensive wireless equipment).

While the invention has been described in connection with particular embodiments and examples, the invention is not necessarily so limited, and that numerous other embodiments, examples, uses, modifications and departures from the embodiments, examples and uses are intended to be encompassed by the claims attached hereto. For example, aspects of certain embodiments (e.g., some of those expressly discussed above) can be combined with or substituted with aspects of other embodiments (e.g., others of those expressly discussed above) in various ways. Similarly, unless otherwise limited, block diagrams of the various figures, as used to illustrate operations of various methods, are not intended to require a particular order of operations. For example, certain illustrated (and other) operations can be undertaken simultaneously or in a different sequence than is ostensibly indicated by the block diagrams. Further, in some implementations, aspects of various different methods can be combined together, substituted for each other, implemented by devices other than those expressly discussed in the relevant examples, and so on.

The entire disclosure of each patent and publication cited herein is incorporated by reference, as if each such patent or publication were individually reproduced herein.

Various features and advantages of the invention are set forth in the following claims.

We claim:

1. A management system for a fleet of material handling vehicles, the management system comprising:
    a management server system enabled for communication over a management network, including management server;
    a first material handling vehicle with a first telematics controller and a processor device;
    a second material handling vehicle with a second telematics controller, and a second-vehicle vehicle identification;
    the processor device of the first material handling vehicle being configured to:
        determine that the second material handling vehicle is in proximity to the first material handling vehicle;
        obtain the second-vehicle vehicle identification from the second material handling vehicle;
        based upon the second-vehicle vehicle identification, determine whether the second material handling vehicle is a missing vehicle; and
        log multiple material handling vehicles of the fleet that have been determined to be in proximity to the first material handling vehicle; and
        report the log to the management server via at least one of:
            a mesh network that includes the first material handling vehicle; and
            a direct communications link between the first material handling vehicle and a mobile device; and
    wherein the first telematics controller is a multi-channel controller configured to communicate with the second telematics controller over a first channel and to communicate with the management server over a second channel.

2. The management system of claim 1, wherein the first material handling vehicle is configured to form part of the mesh network with a plurality of other material handling vehicles; and
    wherein the processor device is further configured to communicate with at least one of the management server system and the second material handling vehicle via the mesh network.

3. The management system of claim 2, wherein the first material handling vehicle is configured to transmit communication between the management server system and one or more of the plurality of other material handling vehicles via the mesh network.

4. The management system of claim 1, wherein the processor device is further configured to:
    download an update from the management server system;
    establish a communications link with the second material handling vehicle; and
    upload the update to the second material handling vehicle.

5. The management system of claim 4, wherein the processor device is configured to upload the update based upon determining that the second material handling vehicle is a missing vehicle.

6. The management system of claim 1, wherein the first material handling vehicle includes a long-range communication device and a short-range communication device; and
    wherein the processor device is further configured to communicate with the management server system via the long-range communication device and to communicate with the second material handling vehicle.

7. The management system of claim 1, wherein the processor device is further configured to:
    report the log to the management server system to determine whether any vehicle within the multiple material handling vehicles is a missing vehicle.

8. The management system of claim 7, further comprising:
    a mobile device configured to obtain a first-vehicle vehicle identification from the first material handling vehicle and, based upon the first-vehicle vehicle identification, to establish a communications link with the first material handling vehicle;

wherein the processor device is configured to report the log to the management server system via the communications link.

9. The management system of claim 1, wherein determining that the second material handling vehicle is in proximity to the first material handling vehicle is based upon an availability of a direct communications link between the second material handling vehicle and the first material handling vehicle.

10. The management system of claim 1, wherein the processor device of the first material handling vehicle is further configured to, based upon determining that the second material handling vehicle is a missing vehicle, execute control over a function of the second material handling vehicle, including at least one of:
 stopping operation of one or more systems of the second material handling vehicle; and
 preventing an operator from executing one or more operations on the second material handling vehicle.

11. A fleet of material handling vehicles configured to be managed via a management network with a management server, the fleet of material handling vehicles comprising:
 a first material handling vehicle with a first telematics controller, a first-vehicle vehicle identification, and a processor device;
 a second material handling vehicle with a second telematics controller, and a second-vehicle vehicle identification;
 a plurality of additional material handling vehicles configured to form a mesh network with the first and second material handling vehicles to facilitate remote communication between the first and second material handling vehicles and the management server;
 the processor device being configured to:
  determine that the second material handling vehicle is in proximity to the first material handling vehicle;
  obtain the second-vehicle vehicle identification from the second material handling vehicle;
  based upon the second-vehicle vehicle identification:
   determine whether the second material handling vehicle is a missing vehicle; and
   establish a communications link with the second material handling vehicle;
  log a plurality of encounters with a plurality of other material handling vehicles of the fleet and
  report the log to the management server via at least one of:
   the mesh network that includes the first material handling vehicle; and
   a direct communications link between the first material handling vehicle and a mobile device.

12. The fleet of material handling vehicles of claim 11, wherein the first material handling vehicle is configured to communicate via the mesh network to upload a firmware update to the second material handling vehicle, based upon determining that the second material handling vehicle is a missing vehicle.

13. The fleet of material handling vehicles of claim 12, wherein the first material handling vehicle is further configured to communicate via the mesh network to one or more of:
 determine whether the second material handling vehicle is a missing vehicle; and
 download the firmware update from the management server.

14. The fleet of material handling vehicles of claim 11, wherein the first telematics controller is configured to operate as a web server to serve a web page; and
 wherein the web page enables control over the first material handling vehicle for a mobile device accessing the web page;
 wherein the first telematics controller is a multi-channel controller configured to communicate with the second telematics controller over a first channel and to communicate with the management server over a second channel.

15. The fleet of claim 12, wherein the processor device is configured to, based upon determining that the second material handling vehicle is a missing vehicle:
 determine a status of firmware installed on the second material handling vehicle; and
 based upon the status, upload the firmware update to the second material handling vehicle via the communications link.

16. A method of managing a fleet of material handling vehicles using a management network with a management server, the fleet including a first material handling vehicle having a first telematics controller, the first telematics controller being a multi-channel controller, and a second material handling vehicle having a second telematics controller, the method comprising:
 establishing a first communications link between the first telematics controller and the second telematics controller over a first channel of the first telematics controller;
 establishing a second communications link between the first telematics controller and the management server over a second channel of the first telematics controller;
 detecting, using the first material handling vehicle, identification data of the second material handling vehicle;
 determining, based upon the identification data of the second material handling vehicle, that the second material handling vehicle is a missing vehicle;
 logging a plurality of encounters with a plurality of other material handling vehicles of the fleet and
 reporting the log to the management server via at least one of:
  a mesh network that includes the first material handling vehicle; and
  a direct communications link between the first material handling vehicle and a mobile device.

17. The method of claim 12, further comprising:
 implementing a remedial measure for the second material handling vehicle using the first material handling vehicle, based upon determining that the second material handling vehicle is a missing vehicle;
 wherein the remedial measure includes one or more of:
  stopping operation of one or more systems of the second material handling vehicle;
  preventing an operator from executing one or more operations on the second material handling vehicle; and
  cycling one or more systems of the second material handling vehicle.

18. The management system of claim 10, wherein control is executed over the function of the second material handling vehicle further based upon determining that an update is available for a firmware or software aspect of the second material handling vehicle.

19. The management system of claim 10, wherein controlling the function of the second material handling vehicle further includes at least one of:

executing a diagnostic function for the second material handling vehicle; and cycling one or more systems of the second material handling vehicle.

* * * * *

UNITED STATES PATENT AND TRADEMARK OFFICE
CERTIFICATE OF CORRECTION

PATENT NO. : 10,338,603 B2  
APPLICATION NO. : 15/412453  
DATED : July 2, 2019  
INVENTOR(S) : Joshua D. Vanderpool et al.

Page 1 of 1

It is certified that error appears in the above-identified patent and that said Letters Patent is hereby corrected as shown below:

In the Specification

Column 13, Line 14, "MEW" should be --MHV--.

In the Claims

Column 19, Claim 11, Line 53, "device." should be --device, wherein the first telematics controller is a multi-channel controller configured to communicate with the second telematics controller over a first channel and to communicate with the management server over a second channel.--.

Column 20, Claim 14, Line 6, "page;" should be --page.--.

Column 20, Claim 14, Lines 7-11 should be deleted.

Signed and Sealed this  
Twenty-seventh Day of August, 2019

Andrei Iancu  
*Director of the United States Patent and Trademark Office*